(12) United States Patent
Rossi et al.

(10) Patent No.: US 7,749,207 B2
(45) Date of Patent: Jul. 6, 2010

(54) ELASTOMERIC LAMINATES AND GARMENTS FORMED THEREBY

(75) Inventors: Cal Rossi, Huntersville, NC (US); Les Whitlock, Cherryville, NC (US)

(73) Assignee: HBI Branded Apparel Enterprises, LLC, Winston-Salem, NC (US)

( * ) Notice: Subject to any disclaimer, the term of this patent is extended or adjusted under 35 U.S.C. 154(b) by 1120 days.

(21) Appl. No.: 11/375,776

(22) Filed: Mar. 15, 2006

(65) Prior Publication Data

US 2006/0211317 A1    Sep. 21, 2006

Related U.S. Application Data

(60) Provisional application No. 60/662,086, filed on Mar. 15, 2005, provisional application No. 60/702,833, filed on Jul. 27, 2005.

(51) Int. Cl.
   *A61F 13/15*    (2006.01)

(52) U.S. Cl. ......................... 604/385.07; 2/73
(58) Field of Classification Search ............... 2/69, 2/73, 107, 113; 604/385.07
See application file for complete search history.

(56) References Cited

U.S. PATENT DOCUMENTS

| | | | |
|---|---|---|---|
| 3,253,598 A | 5/1966 | Spanel | 128/521 |
| 3,489,154 A | 1/1970 | Kaspar et al. | 128/521 |
| 4,262,049 A | 4/1981 | Kaspar | 428/131 |

*Primary Examiner*—Arti Singh-Pandey
(74) *Attorney, Agent, or Firm*—Womble Carlyle Sandridge & Rice PLLC

(57) ABSTRACT

A synthetic elastomeric laminate and a control garment are provided. The laminate and garment include a sheet of synthetic rubber and one or more fabric layers laminated to the sheet of synthetic rubber. A process for making an elastomeric laminate is also provided. The process includes cutting a plurality of apertures in an elastomeric sheet of foamed synthetic rubber to define an apertured elastomeric sheet and laminating a first fabric layer to a first side of the apertured elastomeric sheet.

5 Claims, 3 Drawing Sheets

ELASTOMERIC LAMINATES AND GARMENTS FORMED THEREBY

CROSS REFERENCE TO RELATED APPLICATIONS

This application claims the benefit of U.S. Provisional Application Ser. No. 60/662,086, filed on Mar. 15, 2005 and U.S. Provisional Application Ser. No. 60/702,833, filed on Jul. 27, 2005, the contents of both of which are incorporated by reference herein.

BACKGROUND OF THE INVENTION

1. Field of the Invention

The present invention is related to elastomeric laminates. More particularly, the present invention is related to fabrics laminated to synthetic rubber and control garments formed therefrom.

2. Description of Related Art

Natural rubber (e.g. latex) is known for its strong elastic and recovery properties. Latex has been used in many different garment and textile applications requiring elastic areas. For example, latex has been laminated between two layers of fabric for use in shape wear or control garments (hereinafter "control garment") such as, but not limited to, medical braces, sports brassieres, girdles, pantyhose, and others.

The manufacture of such latex laminate garments is known. For example, a sheet of cured latex can be adhered between two layers of fabric using a liquid latex adhesive. In many applications, the latex sheet can include an open or porous pattern formed therein and/or foam portions. The fabric and latex laminate are exposed to a curing or vulcanization process so that the liquid latex cures to the fabric and the latex sheet.

Unfortunately, latex includes proteins known to cause adverse immune system responses (e.g., allergic reactions). Thus, latex garments and fabrics have not been available to all portions of the population.

During the formation of garments, it is often desired for the fabric to be dyed a particular color. Latex can be dyed and/or pigmented (hereinafter "dyed") to many basic colors (e.g., black, white).

Accordingly, there is a continuing desire for fabrics and garments having the attributes available from latex, while mitigating and/or overcoming one or more of the aforementioned deficiencies and/or deleterious effects associated with latex.

BRIEF SUMMARY OF THE INVENTION

It is an object of the present invention to provide a synthetic elastomeric laminate and control garments formed therefrom.

It is another object of the present invention to provide a sheet of synthetic rubber laminated to one or more fabric layers and control garments formed therefrom.

It is still another object to provide a control garment having one or more portions defined by a laminate of a first fabric, a synthetic elastomeric sheet, and a second fabric. The first fabric is bonded to a first side of the synthetic elastomeric sheet, while the second fabric is bonded to a second side of the synthetic elastomeric sheet. The type of bonds between the first fabric and the synthetic elastomeric sheet and the second fabric and the synthetic elastomeric sheet can be the same or different.

It is a further object of the present invention to provide a sheet of synthetic polyisoprene bonded to an elastic fabric layer. The elastic fabric layer can be any woven, or warp/weft knitted fabric exhibiting elastic properties. The bond between the sheet of synthetic polyisoprene and the fabric layer can an adhesive bond, a chemical bond, a welded bond, or any combinations thereof.

It is a still further object of the present invention to provide a synthetic elastomeric laminate having a desired pattern defined therein.

It is a yet a further object of the present invention to provide a synthetic elastomeric laminate dyed to a desired color.

The above-described and other features and advantages of the present invention will be appreciated and understood by those skilled in the art from the following detailed description, drawings, and appended claims.

DETAILED DESCRIPTION OF THE INVENTION

Figure 1:
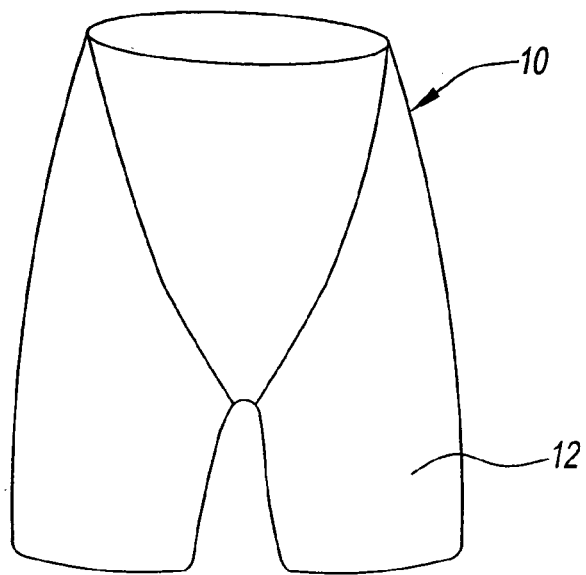
FIG. 1 illustrates a perspective view of an exemplary embodiment of a control garment according to the present invention.
Figure 2:
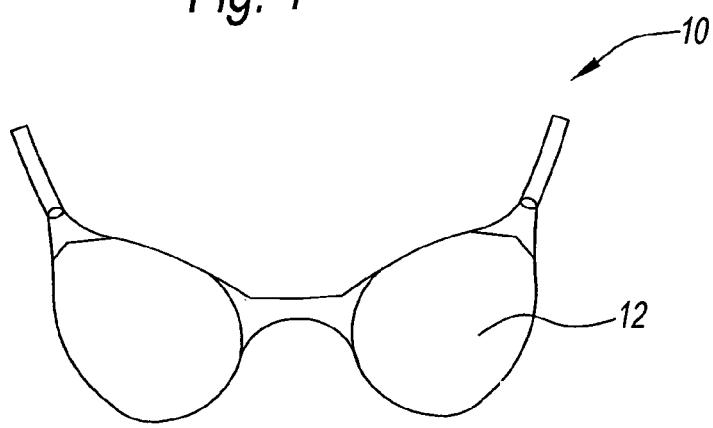
FIG. 2 illustrates a perspective view of an alternate exemplary embodiment of a control garment according to the present invention

Referring to the drawings and in particular to FIGS. 1 and 2, exemplary embodiments of control garments according to the present invention generally referred to by reference numeral 10 are shown. For purposes of clarity, control garment 10 is illustrated as a panty girdle in FIG. 1 and as a brassiere in FIG. 2. Of course, it is contemplated by the present invention for control garment 10 to be other control garments such as, but not limited to, open girdles, medical braces, and others.

Advantageously, control garment 10 provides the shaping characteristics and durability of prior garments without the deleterious effects associated with natural latex rubber.

Control garment 10 can include one or more portions of an elastomeric laminate 12. In some embodiments, control garment 10 can be made entirely of elastomeric laminate 12. However, it is also contemplated by the present invention for only desired sections of control garment 10 to be made of elastomeric laminate 12.

Figure 3:
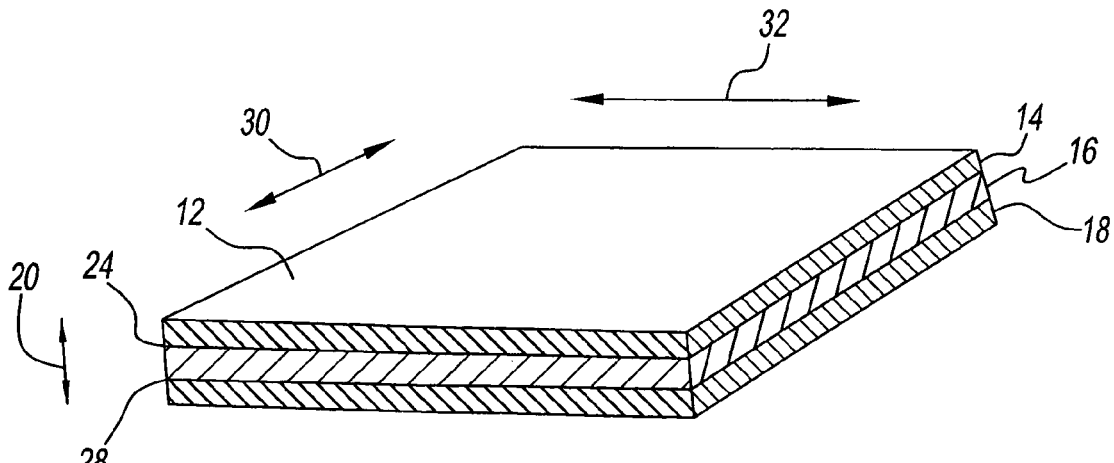
FIG. 3 illustrates a sectional view of an elastomeric laminate used in the construction of the control garments of FIGS. 1 and 2.

Referring now to FIG. 3, elastomeric laminate 12 includes a first fabric layer 14, an elastomeric sheet 16, and a second fabric layer 18.

First and second fabric layers 14, 18 can be any woven, non-woven, or knitted fabric exhibiting elastic or inelastic properties. For example, first and second fabric layers 14, 18 can be a fabric such as, but not limited to, a warp knit fabric, a circular knit fabric, a lace fabric, a laminated fabric, a wide fabric, or any combinations thereof.

Elastomeric sheet 16 is a sheet of foamed synthetic rubber. An exemplary synthetic rubber preferred by the present invention includes latex free synthetic polyisoprene sold under the tradename ISOPUR and commercially available from Fulflex Incorporated of Lincoln, R.I.

In a preferred embodiment, elastomeric sheet 16 has a thickness 20 of between about 0.1 to about 3 mm (millimeters) and any subranges therebetween, with between about 0.1 to about 0.2 mm being preferred.

First fabric layer 14 is bonded to elastomeric sheet 16 by a first bond 24. Similarly, second fabric layer 18 is bonded to elastomeric sheet 16 by a second bond 28. First and second bond 24, 28 can be an adhesive bond, a chemical bond, a welded bond, or any combinations thereof.

Adhesive bonds can be provided by a powdered adhesive, a film adhesive, a web adhesive, or a liquid adhesive. Preferably, the adhesive bond is formed using a liquid polyurethane reactive (PUR) adhesive.

Welded bonds can be provided by welding one or more portions of first and second fabric layers 14, 18 and elastomeric sheet 16 to one another. The welding layers 14, 18 and sheet 16 to one another can be achieved by any heat source and, preferably from a sonic welding process.

First and second bonds 24, 28 can be selected based on the requirements of first and second fabric layers 14, 18, respectively. Thus, it is contemplated by the present invention for first and second bonds 24, 28 to be the same bond type or to be a different bond type.

Elastomeric laminate 12 and, thus, control garment 10, provides excellent resistance to the normal wash-and-wear cycle of such control garments. For example, control garment 10 can be exposed to over 20 laundering cycles and more preferably over 50 cycles without degradation to the shape controlling effects of the control garment.

In addition, elastomeric laminate 12 can be provided as a latex free product. Here, elastomeric sheet 16, first and second fabric layers 14, 18, and first and second bonds 24, 28 are all free of natural latex rubber.

Advantageously, elastomeric laminate 12 can be stretched in a first direction 30 at least about 50% to about 150% and in a second direction 32 at least about 120% to about 250%.

Figure 4:
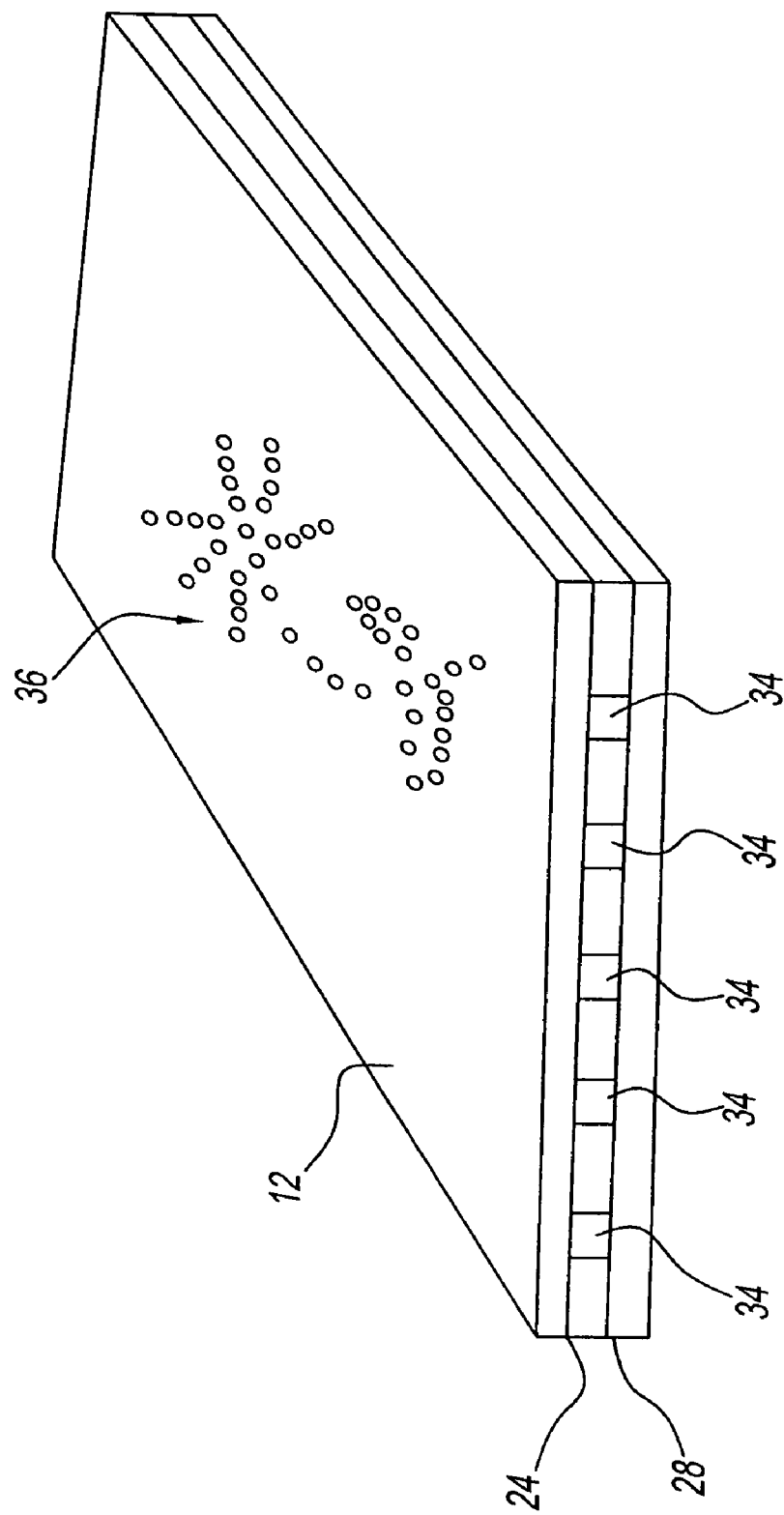
FIG. 4 illustrates a sectional view of an alternate exemplary embodiment of the elastomeric laminate of FIG. 3.

In some embodiments, elastomeric sheet 16 can include a plurality of apertures 34 defined therein to increase the vapor or air permeability of control garment 10 as shown in FIG. 4. Preferably, apertures 34 are defined in elastomeric sheet 16 to provide a desired pattern 36 to control garment 10. In the illustrated embodiment, desired pattern 36 is a floral pattern. Of course, it is contemplated by the present invention for desired pattern 36 to be other non-floral patterns such as, but not limited to, a lace-like pattern, and other patterns. Advantageously, apertures 34 impart desired pattern 36 to first and second fabric layers 14, 18 and, thus, to control garment 10.

It is also contemplated by the present invention for control garment 10 to include other desired patterns imparted to the garment by first and second fabric layers 14, 18. For example, first layer 14 and/or second fabric layer 18 can include a desired pattern such as, but not limited to, an embroidered pattern. In this manner, the pattern of first layer 14 and/or second fabric layer 18 can supplement or replace desired pattern 36 of elastomeric sheet 16.

It should be noted that elastomeric laminate 12 is described herein by way of example having a fabric layer laminated to each side. Of course, it is contemplated by the present invention for elastomeric laminate 12 to have only one fabric layer 14 laminated thereto.

Advantageously, elastomeric sheet 16 can be dyed to any desired basic color and any desired fashion color. In this manner, control garment 10 can be offered in more colors than previously possible. For example, control garment 10 can include first and second fabric layers 14, 18 and elastomeric sheet 16 that are dyed to the same and/or different basic or fashion color.

Figure 5:
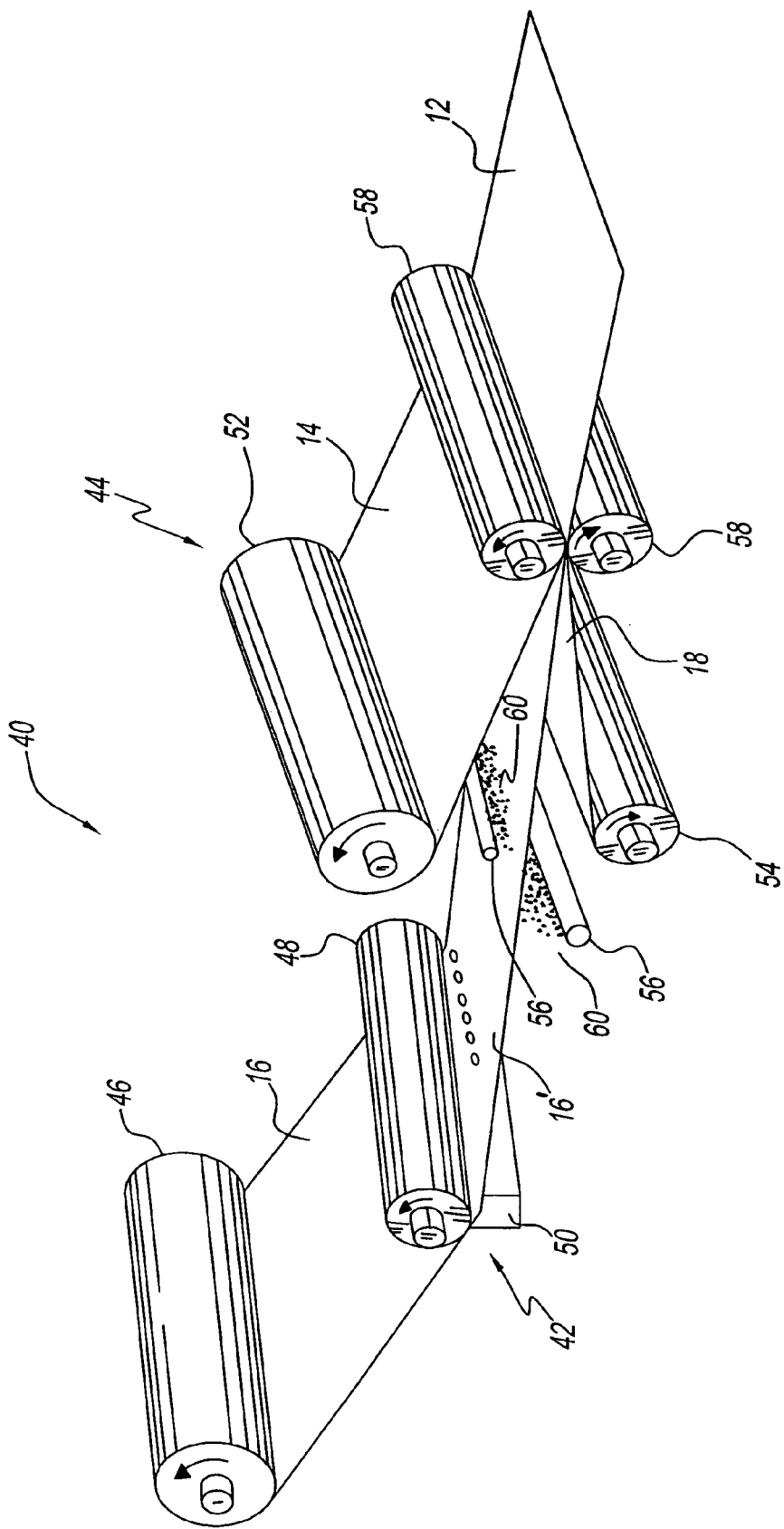
FIG. 5 is a schematic depiction of an exemplary embodiment of a process for making the elastomeric laminate according to the present invention.

Referring now to FIG. 5, a process for making the elastomeric laminate according to the present invention is generally referred to by reference numeral 40. Process 40 includes a first station 42 and a second station 44 for forming elastomeric laminate 12 from elastomeric sheet 16, first fabric layer 14, and second fabric layer 18.

Process 40 feeds elastomeric sheet 16 from a supply 46 to first station 42. As discuss above, elastomeric sheet 16 is a sheet of foamed synthetic rubber. Preferably, control garment 10 is permeable to vapor and/or air, allowing the control garment to breathe while being worn. Accordingly, first station 42 defines apertures 34 in elastomeric sheet 16 to increase the vapor or air permeability of control garment 10. First station 42 can define apertures 34 to provide the desired pattern 36 discussed above with respect to FIG. 4.

First station 42 cuts apertures 34 using a heated process such as, but not limited to, a laser cutter, a sonic cutter, a heated mechanical cutter, and any combinations thereof. While not wishing to be bound to any particular theory, it is believed that the heat of first station 42 seals or fuses the edges of apertures 34, which mitigates tearing of elastomeric sheet 16 at the apertures during use of control garment 10. In a preferred embodiment, first station 42 uses sonic energy to cut apertures 34 in elastomeric sheet 16. For example, first station 42 can be a known sonic cutting process having a sonic cutting head 48 and anvil 50.

After first station 42, process 40 feeds apertured elastomeric sheet 16' to second station for lamination to first and second fabric layers 14, 18. Specifically, process 40 feeds apertured elastomeric sheet 16', first fabric layer 14 from a first supply 52, and second fabric layer 18 from a second supply 54 to second station 44. Second station 44 can be any process for bonding first and second fabric layers 14, 18 to elastomeric sheet 16.

In the illustrated embodiment, second station 44 includes an adhesive application device 56 and a pair of nip rollers 58. Application device 56 inserts a liquid adhesive 60 between first fabric layer 14 and elastomeric sheet 16 and between second fabric layer 18 and the elastomeric sheet. Nip rollers 58 then laminate the materials to define elastomeric laminate 12.

Advantageously, process 40 defines elastomeric laminate 12 in sheet form, where the sheet can be cut to size during process 40 (i.e., after second station 44) or can be rolled into a rolled supply.

For purposes of clarity, process 40 is described as a continuous process having first and second stations 42, 44 continuously making the rolled supply of elastomeric laminate. Of course, it is contemplated by the present invention for process 40 to be a discontinuous process. For example, first station 42 can define apertured elastomeric sheet 16' discontinuously from second station 44 laminating first and second fabric layers 14, 18 to the apertured elastomeric sheet 16'.

It should also be noted that the terms "first", "second", "third", "upper", "lower", and the like may be used herein to modify various elements. These modifiers do not imply a spatial, sequential, or hierarchical order to the modified elements unless specifically stated.

While the present invention has been described with reference to one or more exemplary embodiments, it will be understood by those skilled in the art that various changes may be made and equivalents may be substituted for elements thereof without departing from the scope of the present invention. In addition, many modifications may be made to adapt a particular situation or material to the teachings of the disclosure without departing from the scope thereof. Therefore, it is intended that the present invention not be limited to the particular embodiment(s) disclosed as the best mode contemplated, but that the invention will include all embodiments falling within the scope of the appended claims.

What is claimed is:

1. A control garment forming either a brassiere or a panty girdle, the control garment comprising:
 a laminate forming at least a portion of the control garment, the laminate comprising:
  a sheet of synthetic polyisoprene having
   a first side and a second side,
   a plurality of apertures formed through the sheet and having fused edges;
  and
  a first fabric layer and second fabric layer bonded with a liquid polyurethane reactive adhesive to the sides of said sheet of synthetic polyisoprene.

2. The control garment of claim 1, wherein said sheet of synthetic polyisoprene is dyed.

3. The control garment of claim 1, wherein said sheet of synthetic polyisoprene, said first fabric layer, and said second fabric layer are dyed.

4. The control garment of claim 1, wherein said sheet of synthetic polyisoprene having said first fabric layer bonded to said first side is stretchable in a first direction at least about 50% to about 150% and in a second direction at least about 120% to about 250%.

5. The control garment of claim 1, wherein said plurality of apertures are formed by a heated cutting process.

* * * * *